Aug. 15, 1961 J. R. COX 2,996,301
COLLET
Filed July 15, 1960 2 Sheets-Sheet 2

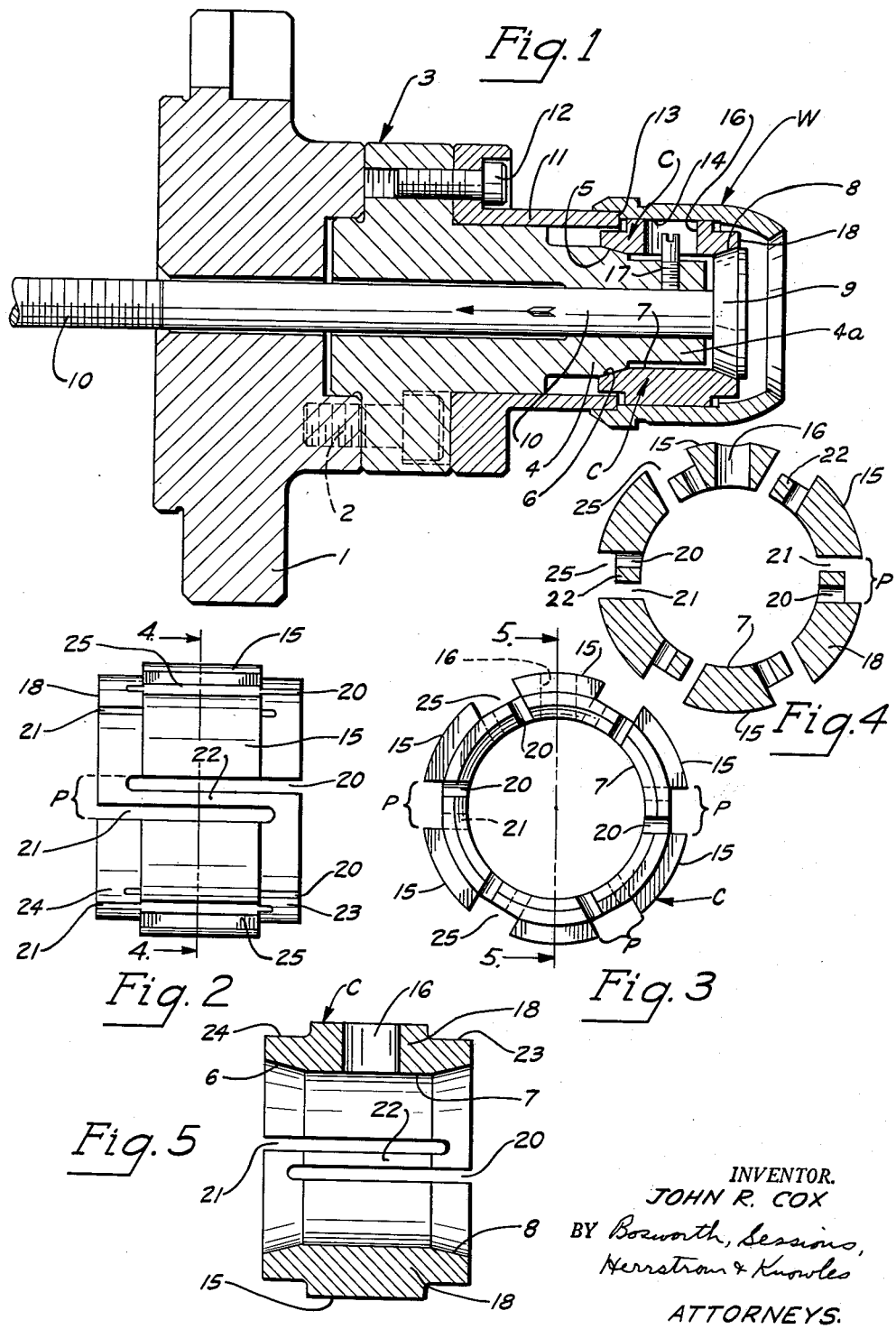

INVENTOR.
JOHN R. COX
BY Bosworth, Sessions,
Herrstrom & Knowles
ATTORNEYS.

United States Patent Office 2,996,301
Patented Aug. 15, 1961

2,996,301
COLLET
John R. Cox, Lakewood, Ohio, assignor to Balas Collet Manufacturing Co., Cleveland, Ohio, a corporation of Ohio
Filed July 15, 1960, Ser. No. 43,150
3 Claims. (Cl. 279—46)

This invention relates to chucking or gripping devices for holding bar or tubular workpieces during rotation in a machine tool or the like.

So-called "collet chucks" comprise a widely used type of holding means for gripping the work, which may be either in the form of a bar or rod or of tubular cross section, in a screw machine or other machine tool. Such collet chucks commonly include a tubular or cylindrical sleeve member or collet having a surface or surfaces adapted to engage and grip the workpiece. Such collets are so constructed that they are resiliently expansible or contractible, depending on whether they are intended to be disposed within a tubular workpiece and expanded outwardly into engagement with the inner surface thereof or to encompass a rod or bar and be contracted inwardly into gripping engagement with the outer surface thereof.

It is among the objects of the present invention to provide an improved collet or expansible and contractible sleeve member for use in stock gripping chucks of the type referred to above and which has a greater range of expansion or contraction than previously proposed collet devices, which has long life and is not susceptible to fatigue failure in the manner of previous devices, and which may readily be adapted to use either with bar or tubular workpieces.

The above and other objects of my invention will appear from the following description of a collet chuck and several forms of my improved collet, reference being had to the accompanying drawings in which:

FIGURE 1 is a longitudinal cross-sectional view of a typical collet chuck adapted to support a tubular workpiece on the rotating spindle of a machine tool, the chuck being equipped with my improved expansible collet;

FIGURE 2 is an enlarged detached side elevation of the collet incorporated in the chuck shown in FIGURE 1;

FIGURE 3 is an end elevation of the collet shown in FIGURE 2;

FIGURE 4 is a transverse cross-sectional view taken on line 4—4 of FIGURE 2;

FIGURE 5 is a longitudinal cross-sectional view taken on line 5—5 of FIGURE 3;

Figure 6:
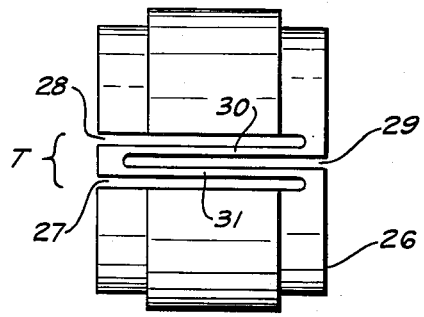
FIGURE 6 is a view generally similar to FIGURE 2 but illustrating a modified form of my invention.

Before describing the illustrated embodiment of my invention in detail, it is pointed out that although the chuck and collet herein illustrated and described are arranged and intended to grip the inner surface of a hollow or tubular workpiece, the collet being expanded into gripping engagement with the work, my invention is equally adaptable to collets that encompass a cylindrical workpiece and are contracted into gripping engagement with an outer surface thereof. Although the contractible type of collect is not illustrated herein, it is well known in the art, and it is intended that the claims appended to this specification extend to and include both expansible and contractible collet devices when not otherwise specifically limited.

The chuck assembly, seen in longitudinal cross section in FIGURE 1, is adapted to be carried on and rotated with the rotatable spindle or head stock of a screw machine, lathe or the like. A support or base member 1 is mounted on the rotating spindle of the machine tool. Secured to base 1, as by screws 2, is the collet support 3 having an outer end portion 4 of reduced diameter. A tapered conical cam or wedge surface 5 is formed inwardly from the end of the end portion 4 of collet support 3 and is adapted to engage a correspondingly tapered conical seat 6 formed adjacent the inner end of the center bore in the sleeve member 18 of collet C. The diameter of the portion 4a of the outer end 4 of the collet support 3, which extends outwardly beyond the tapered cam surface 5, is slightly less than the inner diameter of the bore 7 of the collet C (see FIGURE 1), and a corresponding but oppositely tapering conical seat 8 is formed at the outer end of the bore 7.

Conical seat 8 is engaged by a correspondingly conical movable cam or wedge member 9 carried by the operating bar or rod 10 which is slidably supported in a suitable center bore in the collet support 3 and extends on through another corresponding bore in the support member 1. As is well understood in this art, suitable means (not shown) is provided for operating the rod 10 whereby the conical wedge member 9 may be moved to the left (FIGURE 1) to cause the collet C to grip the workpiece W and in the opposite direction to release the grip of the collet upon the workpiece as will be later explained.

A workpiece locating member 11 is carried by collet support 3 and secured thereto as by screws 12. As illustrated, the outer end of member 11 overlies the inner end of collet C and is positioned so that it will engage a shoulder 13 on the inner bore 14 of the workpiece W. The configuration of the workpiece shown is merely illustrative, but it will be understood that the outer diameter across the work gripping face portions or lands 15 of collet C (see FIGURES 3 and 4), when the collet is in its normal or relaxed state, is such that the bore 14 of workpiece W will slide readily thereover. Movement of the workpiece W over the collet C is limited by engagement of shoulder 13 on the workpiece with the end of the locating member 11. When in this position the gripping face portions 15 of the collet are properly disposed to engage the workpiece, and, when the collet sleeve 18 is expanded as will be later described, firmly grip same and provide proper support for subsequent machining operations.

As seen in FIGURES 1, 4 and 5, the collet C has an elongated slot 16 extending through the wall of sleeve portion 18 thereof from one of the work gripping surfaces 15 into the inner bore 7. A stop pin 17 is screwed into the outer end portion of collet support 3 and extends up into slot 16, thus preventing relative rotational movement of collet C and collet support 3 while permitting limited relative longitudinal movement thereof.

The collet C is resiliently expansible from its normal or relaxed diameter, as will be explained later when the collet per se is described in detail. Referring to FIGURE 1, and assuming that collet C is in such normal or relaxed condition because of the fact that the conical wedge 9 is not exerting an inward force thereon, when a workpiece W is slipped over the work gripping faces 15 of collet C and the rod 10 is then moved to the left, an expanding force is exerted on the conical seat 8 at the outer end of sleeve 18 or collet C by the conical wedge 9 and simultaneously a similar expanding force is exerted on the conical seat 6 in sleeve 18 by the conical cam surface 5 on the cam support 3. Collet C will thus be expanded radially into firm gripping and holding engagement with the inner bore 14 of the workpiece W. When it is desired to release the workpiece W for removal from the chuck, the rod 10 and conical wedge member 9 are moved, or permitted to move, to the right, thus allowing the collet C to contract due to its inherent resiliency and release its grip on the workpiece. This action and the general arrangement of the chuck are well known and are not specifically involved in the present invention which resides in the improved collet construction that will now be described.

Prior to the present invention, a common way of making a resilient collet has been to cut slots inwardly from the ends of a tubular sleeve member, the slots being spaced apart around the circumference of the sleeve and extending inwardly alternately from opposite ends thereof. In this type of device each slot stops short of the other end of the collet and, in order to provide the necessary strength and the desired stock gripping surface areas, the circumferential distance between adjacent slots is so great that these portions of the collet are rigid and inflexible. In devices of this type, when expansion occurs the slots open up at their outer ends and all of the bending action takes place at the closed ends of the slots because the portions of the sleeve between pairs of adjacent slots are so wide that they are inflexible. The result of such a design is that the narrow widths of stock between the closed ends of the slots and the adjacent ends of the collet sleeve are subjected to severe stress and failure invariably occurs at these points after a relatively short time. Furthermore, only a very limited degree of expansion or contraction is possible with this type of collet because the sections of metal that must be deformed in order to expand or contract the sleeve are necessarily relatively heavy and inflexible.

My improved resilient collet C is clearly illustrated in FIGURES 2-5 and is provided with a plurality of spaced apart sets P of oppositely extending slots. As shown six sets P of slots are equally spaced around the circumference of the sleeve member 18 of collet C and each set P consists of a slot 20, having its open end at and extending inwardly from the righthand end of the sleeve 18 (FIGURE 2), and a slot 21 having its open end at and extending inwardly from the lefthand end of the sleeve 18. The slot 20 stops short of the left hand end of sleeve 18 and its closed end is spaced therefrom. In like manner the closed end of slot 21 is similarly spaced from the righthand end of sleeve 18. These closed end slots 20 and 21 of each set P, as clearly seen in FIGURES 2 and 5, are disposed close together so that a relatively thin flexible resilient leaf or spring element 22 extends between the closed ends of the adjacent slots of each set.

As previously explained, the sleeve 18 of collet C is provided with gripping faces or lands 15 which extend between the slot 20 of one set P and the slot 21 of the next set. To provide greater resiliency in the leaf members 22 and to give the desired gripping engagement with the workpiece, the end portions of the collet sleeve may be reduced in diameter as indicated at 23 and 24. Furthermore longitudinal grooves 25 are preferably formed in sleeve 18 to separate the gripping lands 15 and also to give the desired dimension radially of the collet to the resilient leaf on web members 22.

Figure 7:
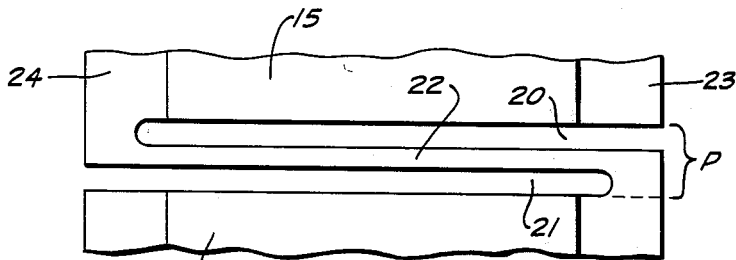
FIGURE 7 is an enlarged fragmentary illustrative view showing one of the resilient spring leaf sections of the collet seen in FIGURE 2 in its normal or relaxed position.
Figure 8:
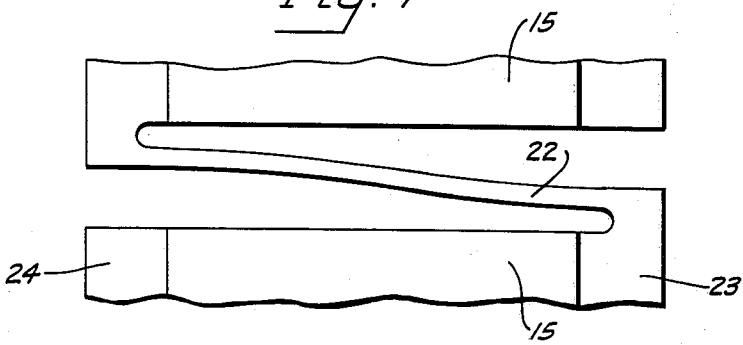
FIGURE 8 is a view similar to FIGURE 7, illustrating in an exaggerated manner the flexing of the spring leaf members of my improved collet which occurs during expansion thereof.

In FIGURES 7 and 8 I have illustrated in enlarged form one set of slots P made up of slots 20 and 21 and forming the leaf element 22. In FIGURE 7 these elements are shown in their normal relaxed condition such as obtains when no force tending to change its diameter is exerted on the collet sleeve. FIGURE 8 illustrates, in exaggerated dimensions, what happens when the collet C is expanded by moving the conical cam 9 to the left as seen in FIGURE 1. The leaf member 22 flexes throughout its length and takes on a somewhat S-curved form, the open ends of the slots moving apart while the closed ends are subjected to relatively small stress and any tendency to break across between the bottom of the slot and the end of the collet sleeve is so reduced that it is of no consequence so far as life of the collet is concerned.

By providing a plurality of relatively thin resilient spring or leaf sections disposed around the circumference of a collet sleeve at rather widely spaced intervals, the sections of the sleeve between the resilient leaf sections being of substantial circumferential width and rigid and non-resilient, a collet is provided which has the desired area and arrangements of work engaging faces but which has much greater expansibility and life than previous collets with which I am familiar.

In FIGURE 6 I have illustrated a modified form of my invention wherein the collet sleeve 26, rather than being provided with pairs of slots P as seen in FIGURES 2-5, is provided with spaced sets of three slots generally indicated at T in FIGURE 6. Two of these slots, 27 and 28, extend inwardly from the lefthand ends of the sleeve 26 while the intermediate slot 29 extends inwardly from the righthand end of sleeve 26. As seen in the drawings, all of these slots stop short of the opposite end of the sleeve 26 and together they provide a pair of resilient leaf or spring members 30 and 31. It will be understood that a plurality of sets T of slots are circumferentially spaced around the collet sleeve 26 to give the desired resiliency to the entire unit and to provide the proper number of work gripping areas or lands.

Although I have described the illustrated embodiments of my invention in considerable detail, it will be understood that variations and modifications may be made in the design of my improved collet without departing from the spirit of my invention; for example, the collet may be arranged to expand into engagement with the inside of a tubular or hollow workpiece as illustrated herein, or it may be arranged to be contracted into engagement with a cylindrical or bar type of workpiece. Accordingly I do not wish to be limited to the exact devices herein shown and described but claim as my invention all forms thereof coming within the scope of the appended claims.

I claim:

1. A radially resilient tubular collet comprising a plurality of circumferentially spaced rigid portions having work gripping faces, and a plurality of elongated resilient leaf members disposed one between each adjacent pair of said rigid portions, each of said leaf members being integrally connected at one end to one end of one of the pair of rigid portions between which it is disposed and being integrally connected at its other end to the other end of the other one of the pair of rigid portions between which it is disposed whereby a pair of oppositely extending slots, closed at one end and open at the other, is provided between each adjacent pair of said rigid portions, and the opposite ends of each of said rigid portions being provided with tapered conical surfaces extending inwardly at least as far as the closed ends of said slots.

2. A radially resilient tubular collet comprising a plurality of circumferentially spaced rigid portions having work gripping faces, and a plurality of elongated resilient leaf members disposed one between each adjacent pair of said rigid portions, each of said leaf members being integrally connected at one end to one end of one of the pair of rigid portions between which it is disposed and being integrally connected at its other end to the other end of the other one of the pair of rigid portions between which it is disposed whereby a pair of oppositely extending slots closed at one end and open at the other, is provided between each adjacent pair of said rigid portions, the width of each of said slots being no greater than the width of the adjacent resilient leaf member, and the opposite ends of each of said rigid portions being provided with tapered conical surfaces extending inwardly at least as far as the closed ends of said slots.

3. A radially resilient collet including a tubular metal sleeve having a plurality of pairs of longitudinally extending slots, said pairs of slots being circumferentially spaced around said sleeve member whereby rigid work gripping face portions are provided between pairs of slots, each pair of slots including one slot extending through the wall of said sleeve and having an open end at one end of said sleeve and a closed end at a point longitudinally spaced from said one end of said sleeve and adjacent to but short of the opposite end thereof and another slot extending through the wall of said sleeve and having an open end at said opposite end of said sleeve and a closed end at a point longitudinally spaced from said opposite end of said sleeve and adjacent to but short of said one end thereof, said slots of each pair being spaced apart circumferentially of said sleeve and forming therebetween a single flexible resilient leaf member integrally connected at one end to one of said rigid work gripping portions and integrally connected at its opposite end to the next adjacent rigid work gripping portion and adapted to be longitudinally flexed to permit resilient radial expansion or contraction of said sleeve, the opposite ends of said sleeve being formed with oppositely tapered conical surfaces extending inwardly at least as far as the closed ends of said slots.

References Cited in the file of this patent
UNITED STATES PATENTS

| | | |
|---|---|---|
| 2,500,491 | Hampton | Mar. 14, 1950 |
| 2,817,532 | Hohwart | Dec. 24, 1957 |